United States Patent [19]
Eberle

[11] Patent Number: 5,381,647
[45] Date of Patent: Jan. 17, 1995

[54] ATV MOWER ARTICULATING HITCH

[75] Inventor: Ronald D. Eberle, Grainfield, Kans.

[73] Assignee: Trail-Buster Dozer, Inc., Grainfield, Kans.

[21] Appl. No.: 142,867

[22] Filed: Oct. 28, 1993

[51] Int. Cl.⁶ .................. A01D 34/64; A01D 34/86; A01B 59/048

[52] U.S. Cl. .................. 56/15.8; 56/15.9; 56/16.2; 56/DIG. 14; 280/492; 280/498; 280/481

[58] Field of Search .............. 56/15.9, 15.8, 6, 13.6, 56/16.2, 15.7, DIG. 22, DIG. 14; 172/297, 298, 459; 280/481, 455.1, 498, 492

[56] References Cited

U.S. PATENT DOCUMENTS

| | | | |
|---|---|---|---|
| 4,325,211 | 4/1982 | Witt et al. | 56/15.8 |
| 4,563,019 | 1/1986 | Kuhn et al. | 56/15.9 X |
| 4,747,257 | 5/1988 | Hutchison | 56/15.9 X |
| 4,787,646 | 11/1988 | Kamlukin et al. | 56/15.8 X |
| 5,060,463 | 10/1991 | Jones | 56/15.9 |
| 5,293,729 | 3/1994 | Curry et al. | 56/15.8 X |

OTHER PUBLICATIONS

Dirt Wheels Magazine; Sep. 1993; p. 14.

Primary Examiner—Stephen J. Novosad

[57] ABSTRACT

An apparatus comprising a front mower driven by a self propelled all terrain vehicle to the rear of the mower and connected by an articulating hitch. The hitch includes a pair of spaced pivot mechanisms to allow the mower to pivot from front to rear relative to the all terrain vehicle and a third pivot mechanism to allow the mower to rotate about a horizontal axis from side to side such that the mower is driven by the all terrain vehicle, but is free to follow the contour of the ground being traversed by the apparatus independent of the all terrain vehicle.

15 Claims, 2 Drawing Sheets

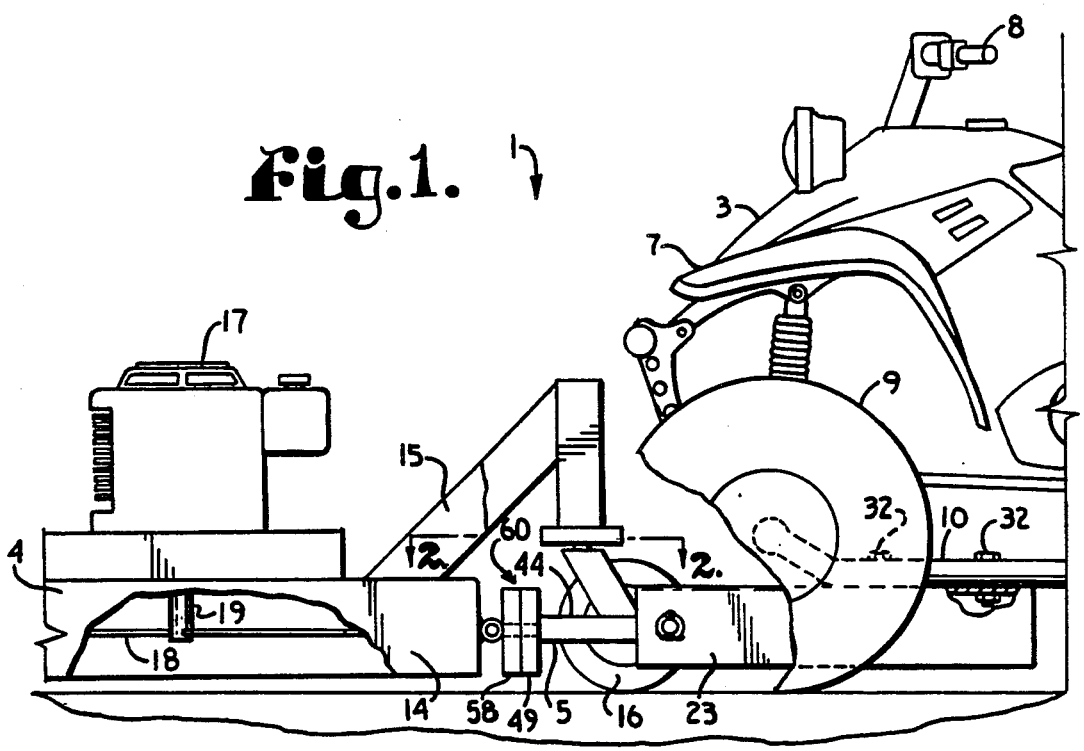
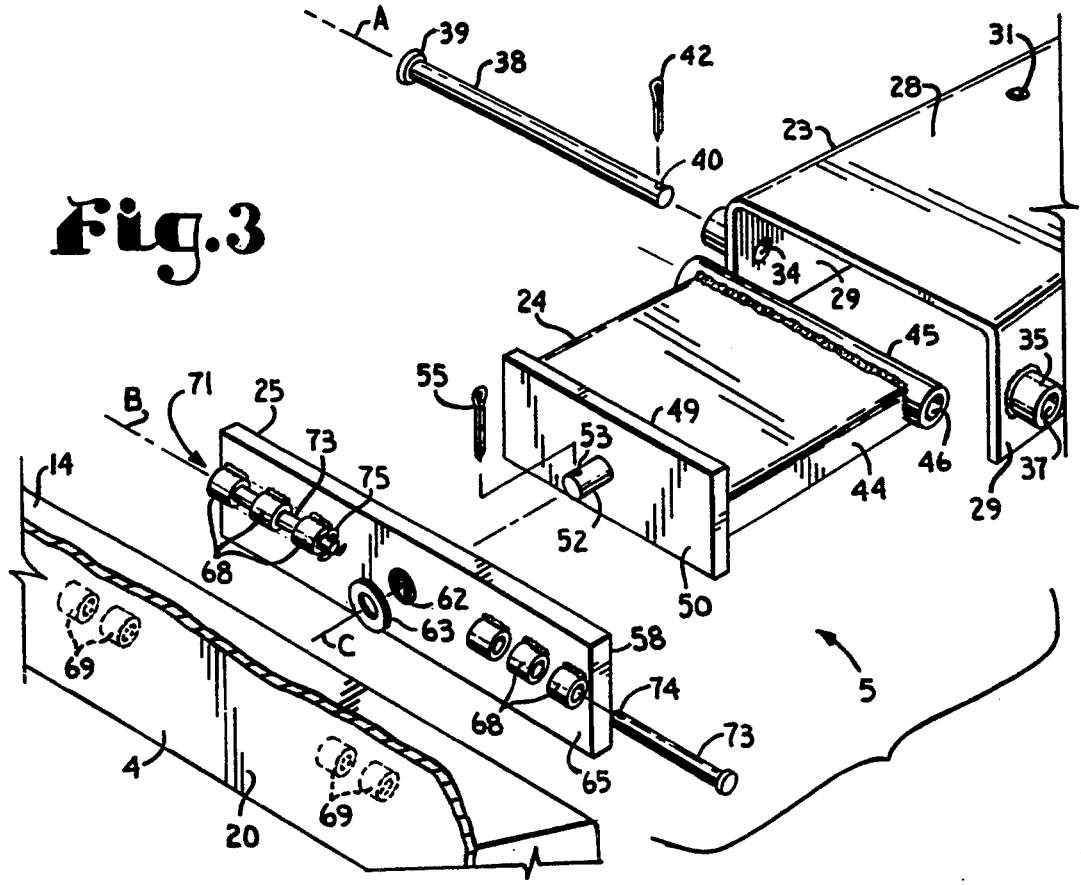

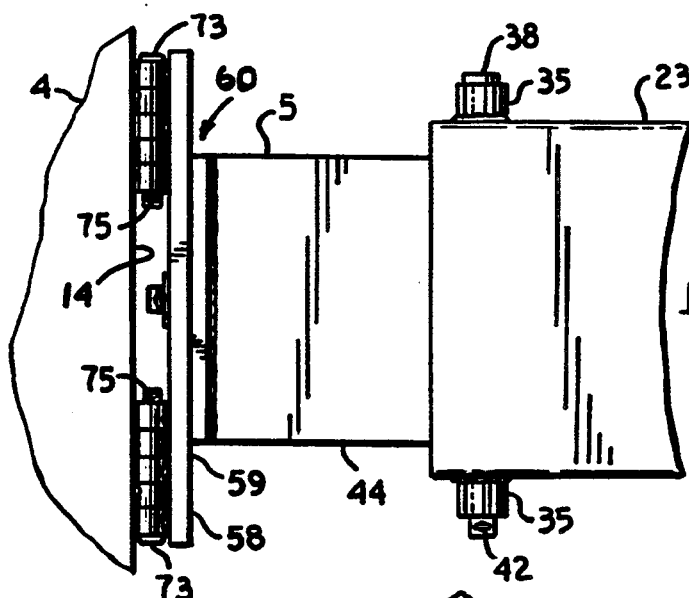
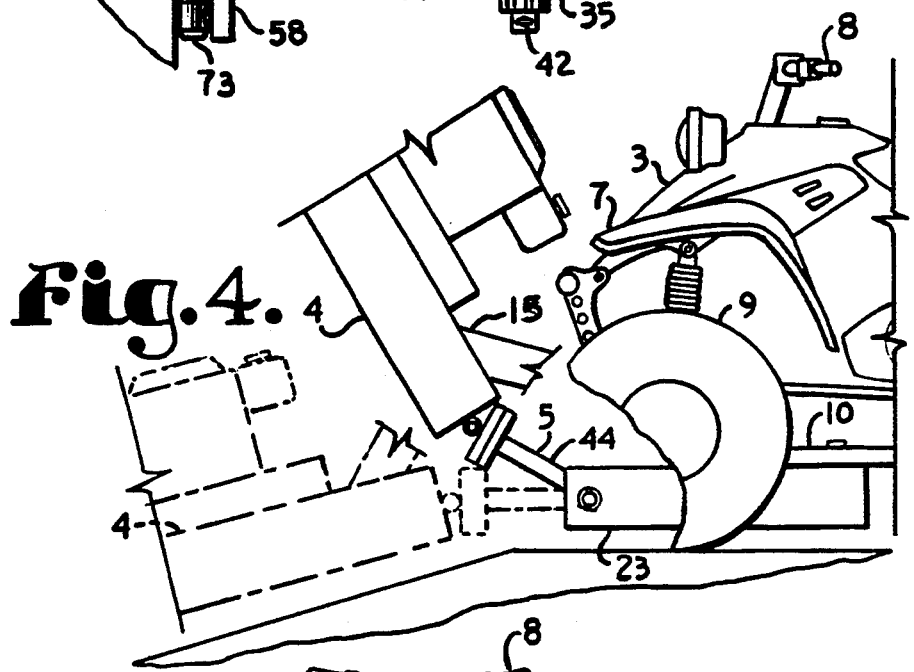
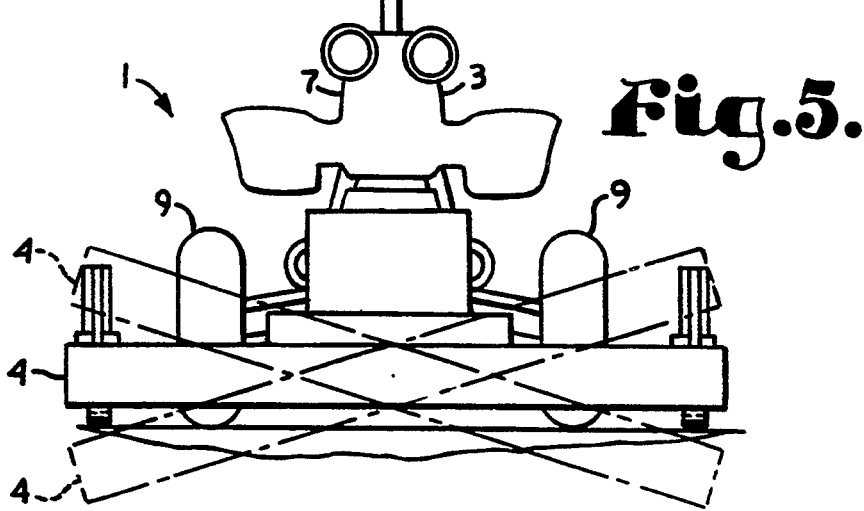

ATV MOWER ARTICULATING HITCH

BACKGROUND OF THE INVENTION

The present application is directed to a hitch for providing articulation between an all terrain vehicle (ATV) and a mower deck positioned in front of the ATV. The hitch allows the mower deck to follow the terrain of the ground being traversed by allowing the mower deck to rotate both from side to side about a horizontal axis aligned with the direction of travel and from front to rear relative to the ATV, while providing resistance to torque about a vertical axis.

The popularity of ATV's has led to the proliferation of various equipment to be used on or in conjunction with an ATV. One somewhat natural combination has been to attempt to utilize the ATV with a mower, as an ATV can traverse fairly rough ground and the addition of a mower to the ATV eliminates the need for a riding lawn mower for the same purpose. Consequently, there have been various combinations of a mower deck with an ATV, with mixed results. The main problem with such a combination has been in the hitch connecting the two devices.

In particular, the combination of a mower deck and an ATV produces a fairly long vehicle where the two vehicles do not traverse exactly the same terrain with the effect that the ATV may be on a completely different slope either with respect to side to side or from front to rear as compared to the mower deck. If the mower deck is hitched to the ATV by a relatively inflexible hitch, then the mower deck will have a tendency to not follow the terrain over which it is traversing, but rather to have approximately the same attitude as the ATV.

This results in an uneven cut and can cause scalping and the like. Consequently, an articulation is needed in the hitch connecting the mower deck and the ATV that allows movement of the mower deck both to rotate about a horizontal axis from side to side and from front to rear relative to the ATV, so that the mower deck can closely follow the terrain over which it passes.

It is also noted that there has been some attempt to build articulated hitches for this purpose in the past. Unfortunately, such hitches have apparently all been designed in such a manner that they would not withstand the forces placed on them by the mower deck and the ATV and have failed rather quickly. The main reason for such failure is that the hitch must be able to transfer the motive power of the ATV to the mower deck without buckling the hitch and without letting the mower swing or torque about a vertical axis to the right or left relative to the ATV. Therefore, not only is an articulated hitch of importance, but the hitch must be sturdy and able to withstand the wear and tear that is normally found in such vehicles and resist torque, while still providing the articulation.

SUMMARY OF THE INVENTION

The present invention is directed to an articulated hitch assembly for joining an ATV with a mower deck that is mounted to the front of the ATV and which receives its motive power from the ATV. The hitch is articulated in such a manner that, although the mower deck is motivated by the ATV, the mower deck is allowed to pivot freely both from front to rear and from side to side about a horizontal axis aligned with the direction of travel to allow the mower deck to follow the contours of the ground being traversed, while being independent of the orientation of the ATV.

In particular, the hitch of the present inventions includes pivot means to allow pivoting of the mower relative to the ATV along an axis which is perpendicular or transverse relative to the general direction of travel of the overall apparatus. Preferably the pivoting is provided by a pair of pivot mechanisms at two spaced locations, such as by the joining of the hitch to the ATV by a pivot pin and bearing combination and likewise the joining of the hitch at an opposite end thereof to the mower by a pivot pin and bearing combination. The utilization of the duel spaced pivot mechanism to allow pivoting along a pair of transverse axes prevents the rearward end of the mower from being locked in position relative to the front end of the ATV, such that the mower can more easily rotate from front to rear to conform to and travel along the surface of the ground being traversed by the apparatus.

Third pivot means comprising a third pivot mechanism, such as a pivot pin and bearing, allows pivoting of a frontward section of the hinge relative to a rearward section thereof along an axis which is generally parallel to the direction of travel or transverse to the apparatus. The third pivot mechanism allows the mower to swing from side to side about a horizontal traversely aligned axis so as to allow the mower to more closely conform to the shape of the ground being traversed thereby, rather than maintain the alignment configuration of the ATV.

The hitch includes structure to resist rotation or torquing of the mower deck about a vertical axis relative to the ATV which allows the ATV to push the mower deck without collapsing the hitch, while maintaining the mower deck in front of the ATV, yet letting the mower deck otherwise articulate relative to the ATV.

OBJECTS AND ADVANTAGES OF THE INVENTION

Therefore, the objects of the present invention are to: to provide a combined mower and ATV apparatus wherein the mower is connected to and pushed by the ATV by an articulated hitch which allows the mower to follow the contour of the ground independent of the ATV both from side to side and from front to rear; to provide such an apparatus wherein the hitch includes two spaced pivot mechanisms both of which pivot about an axis which is generally transverse or perpendicular to the direction of travel of the apparatus so as to allow the mower to follow the contours of the ground being traversed by the mower independent of the ATV from front to rear; to provide such an apparatus having a hitch which further includes a third pivotal mechanism to allow rotation of the mower about a axis which is parallel to the direction of travel of the apparatus, such that the mower is able to pivot independent of the ATV to change the angle of cut with respect to the horizontal from side to side so as to further allow the mower to follow the contour of the ground being traversed by the mower; to provide such a hitch that is durable and capable of relatively long life without breaking or buckling; to provide such a hitch mechanism that is relatively simple to manufacture, easy to assemble, economical to produce and particularly well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary side elevational view of a mower and ATV apparatus joined by an articulating hitch in accordance with the present invention and with portions broken away to show detail thereof.

FIG. 2 is a enlarged and fragmentary view of the apparatus, especially showing the hitch.

FIG. 3 is an enlarged, fragmentary and exploded view of the apparatus principally showing the hitch.

FIG. 4 is a fragmentary and side elevational view of the apparatus on a reduced scale, showing the mower in a first raised position in solid lines and in a lowered position in dashed lines and with portions broken away to show detail thereof.

FIG. 5 is a front elevational view of the apparatus on a reduced scale, showing rotation of the mower from side to side and, in particular, showing the mower in a first configuration relative to the ATV in solid lines and showing the mower in two alternative configurations relative to the ATV in dashed lines.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to a mowing apparatus generally designated by the reference numeral 1 having a self propelled motorized all terrain vehicle (hereinafter ATV) 3 and a mower deck 4 which are both connected by articulating hitch means or mechanism, herein a hitch 5.

In accordance with the present invention, the ATV 3 may be any of the conventional vehicles of this type which have sufficient power to also motivate or push the mower deck 4. The ATV 3 includes a body 7, a steering wheel 8 connected to a pair of front wheels 9 and further includes an undercarriage 10. The particular illustrated ATV 3 has a total of four wheels and has a gasoline consuming self contained motor (not shown).

The mower deck 4 may be custom constructed for the apparatus 1; however, conventionally available mower decks may be suitable for use with the invention with some adaptation. The mower deck 4 includes a housing 14 supported by four outboard wheel assemblies 15 mounted at opposite corners of the housing 14 with each having a ground engaging caster wheel 16. Mounted on the housing 14 is an independent gasoline consuming motor 17 that is drive connected to a pair of mowing blades 18 which are pivotally mounted on the housing 14 by shafts 19 connected by a drive belt (not shown) to the motor 17. The housing 14 also has a rear panel 20 which is connected to the hitch 5.

The articulating hitch 5 is best illustrated in the exploded view shown in FIG. 3 and in the assembled view shown in FIG. 2. The hitch 5 generally includes a mounting assembly 23, an intermediate pivot plate assembly 24 and a mower pivot assembly 25.

The mounting assembly 23 is a channel shaped structure having an upper web 28 and a pair of depending side flanges 29. Positioned at spaced locations in the web 28 are four apertures 31 which receive bolts 32 that are subsequently received through correspondingly spaced and positioned apertures within the ATV undercarriage 10 so as to secure the mounting assembly 23 to the underside of the ATV 3. Near the front end of each of the side flanges 29 are coaxially aligned apertures 34 that are each reinforced by a segment of pipe or journal bearing 35 which is secured by welding to, and extends outwardly from the outer side of each of the respective side flanges 29.

The interior of the journal bearings 35 in conjunction with the apertures 34 form a discontinuous circular bore 37 for receiving a pivot pin 38. The pivot pin 38 includes a head 39 at one end thereof which is larger than the cross section of the bore 37 and a cotter or keeper pin aperture 40 at an opposite end thereof which extends outward from the bore 37 when the pivot pin 38 is inserted in the bore 37.

The intermediate pivot plate assembly 24 has a rectangular and relatively flat shaped body 44 with a pipe or tube 45 welded at the rear end thereof. The pipe 45 has an interior bore 46 having approximately the same diameter as that of the bore 37, such that when assembled with the mounting assembly 23 the pin 38 passes through both the bores 37 and 46 so as to pivotally connect the intermediate pivot plate assembly 24 to the mounting assembly 23 and provide first pivot means allowing pivoting to occur at least at two spaced points or locations along an axis of rotation designated by the reference letter A. While there are numerous points along the pin as well as the axis where pivoting occurs, it is perhaps easiest to consider the interfaces between the pipe 45 and the two side flanges 29 as being the location of two adjacent locations both on the pipe and on the flanges where pivoting occurs, so as to provide a stable and unbuckling connection.

On the front side of the body 44 opposite the pipe 45 is a slide plate 49. The slide plate 49 is welded to the body 44 and is relatively transversely long and vertically high as compared to being traversely narrow. A front side or surface 50 of the slide plate 49 is relatively smooth and even except for a pivot pin 52 which extends traversely forward of the plate 49 from near the center of the plate front surface 50. The pivot pin 52 includes a cotter or keeper pin receiving aperture 53 which receives keeper pin 55 when the hitch 5 is fully assembled.

The mower pivotal assembly 25 comprises a second slide plate 58 having a rear side or surface 59 which slidably engages the front surface 50 of the slide plate 49 when the hitch 5 is fully assembled, as is shown in FIG. 2.

The intermediate pivot plate assembly 24 and mower pivot assembly 25 form first and second major sections respectively of an elongate member 60 forming the main body of the hitch 5 which, if it is broken, could be revised or each varied in length to accomplish the same purpose.

The slide plate 59 is transversely relatively wide and approximately the same vertical height as the slide plate 59, such that when the two are positioned adjacent one another the plates 49 and 58 slide with respect to each other on their respective front surface 50 and rear surface 59. The slide plates 49 and 58 also function to allow a sliding pivotal connection therebetween without being susceptible to easy buckling or twisting which would otherwise weaken or break the hitch 5 at this location. In particular, the relatively wide mating area of the front surface 50 and the rear surface 59 functions to broadly distribute twisting pressures or torquing, such as when the mower deck 4 tries to twist to the left or right about a vertical axis relative to the ATV, to prevent damage to the pivotal connection when the apparatus 1 is used over tortuous terrain.

The slide plate 59 has an aperture 62 that extends traversely through the center thereof. The aperture 62 includes a bearing surface that receives the pin 52 which allows pivoting of the slide plate 58 relative to the pin 52 and thus functions as a pivot means about a horizontally and traversely aligned axis C. The pivot pin 52 is held in place by the cotter pin 55 having a washer 63 positioned between the cotter pin 55 and the slide plate 58.

On the front side 65 of the slide plate 58 is welded a series of coaxially aligned and spaced barrels or bearings 68 formed from segments of a hollow tube or the like. As can be seen in FIG. 2, likewise welded or otherwise mounted on the rear panel 20 of the mower deck housing 14 is a series of similar barrels or bearings 69 which are aligned to intermesh with the slide plate 58 bearings 68 on opposite sides thereof. The bearings 68 and 69 align to form a discontinuous bore 71, when the hitch 5 is assembled, in which a pair of pivot pins 73 are inserted. The pivot pins 73 are secured and held within the opposite sides of the bore 71 by keeper pins 75 and together form second pivot means that allow rotation about a transversely and horizontally aligned axis designated by the letter B. As with the first pivot means this second pivot means provides pivotal interface at least at two locations along the opposed elements of the pivot means to thus provide stability and prevent buckling or collapse thereof Upon full assembly of the hitch 5, as is shown in FIG. 2, the intermediate pivot plate assembly 24 is free to rotate at one end thereof about the axis A passing through the center of the bores 37 and 46 such that the main body of the hitch 5 can rotate relative to the mounting assembly 23 and consequently relative to the ATV 3. Likewise the mower deck 4 can rotate about a transverse axis B passing through the bore 71 to allow the mower deck 4 to rotate from front to rear relative to the main body of the hitch 5 and to, consequently, rotate at two places of articulation or pivot relative to the ATV 3 from front to rear so that the mower deck 4 is free to follow the contour of the ground over which it traverses independent of the orientation or alignment of the ATV from front to rear. That is, if the ground rises suddenly, such as is shown by the position of the mower deck 4 shown in solid lines in FIG. 4 the mower deck 4 can pivot so as to follow the contour of the terrain. Likewise, the mower deck 4 is free to rotate from side to side about an axis C that is parallel to the general direction of travel of the apparatus 1 so that the mower deck 4 can follow the contour of the ground from side to side as is shown in various alignments in FIG. 5, while the ATV 3 follows a different contour. The mower deck rear panel 20 and the plate 58 also function as stop means which due to the configuration of the spacing therebetween and the width of the plate 58 in combination with the positioning of the web 28 relative to the body 44 limits the overall upward rotation or articulation of the mower deck 4 relative to the ATV 3.

Although the hitch 5 of the present invention includes a number of features which make it especially effective in maintaining the mower deck 4 in alignment with the contour of the ground over which it traverses without scalping the ground and without putting more strain than is necessary upon the ATV 3, there are two features which are especially important with respect to the hitch 5. The first of these features is having two different pivot points that allow rotation about a transverse axis which are substantially spaced from each other and which are also spaced from each other by substantial supporting structure to provide strength and endurance to the device. The two spaced pivot means allow the mower deck 4 to freely pivot with respect to the ATV 3 and especially allows a specific point on the rear of the mower deck 4 to vary in height with respect to a point chosen on the ATV 3, yet the ATV 3 can push the mower deck 4 without buckling the hitch 5 by torquing to one side or the other, so as to maintain the ATV 3 in tandem behind the mower deck 4.

The second feature which is especially effective is the arrangement of the slide plates 49 and 58 which are allowed to pivot about the pin 52, but which are kept from significantly rotating relative to one another so that the plates do not bend the pin 52 or do other significant damage to the structure when under torque, because of the large surface area that engages and slides between the two plates 49 and 58. This second feature allows the mower deck 4 to rotate from side to side, as is seen in FIG. 5.

Consequently, the mower deck 4 of the present invention is allowed to rotate and move significantly with respect to the ATV 3 in virtually any direction expect to twist to the sides, because of the structure of the hitch 5, yet the hitch 5 is comparatively very strong and will endure for a substantial period of time as compared to conventionally used hitches because of the constructure thereof.

It is to be understood that while certain forms of the present invention have been illustrated and described herein, it is not to be limited to the specific forms or arrangement of parts described and shown.

What is claimed and desired to be secured by Letters Patent is as follows:

1. A mower apparatus comprising:
   (a) a driver supporting and self propelled all terrain vehicle for motivating the apparatus, vehicle ground engaging wheels, and a steering mechanism;
   (b) a mobile non-self propelled mower deck comprising a self contained motor, ground engaging wheels and a cutter blade driven by said motor; and
   (c) an articulating hitch apparatus joining said mower deck to said all terrain vehicle, such that said mower deck is positioned in front of and motivated by said all terrain vehicle; said hitch apparatus comprising:
      1) first mounting means for connecting said hitch apparatus to said all terrain vehicle;
      2) second mounting means for connecting said hitch apparatus to said mower deck;
      3) a hitch body having first and second sections and structurally connecting said first and second mounting means;

4) first pivotal means providing pivotal rotation of said first mounting means relative to said body along a first axis that is generally perpendicular to a normal direction of travel of the apparatus;

5) second pivotal means providing pivotal rotation of said second mounting means relative to said body along a second axis that is spaced from and parallel to said first axis;

6) third pivotal means pivotally joining said hatch body first and second segments and allowing said first and second mounting means to rotate relative to each other about a third axis that is generally parallel to the direction of normal travel of said mower apparatus, such that said mower deck and said all terrain vehicle each independently follow the contour of the land being traversed thereby; said third pivotal means including a journal pivot pin extending from said first segment and being aligned with said third axis; said second segment having a bore pivotally receiving said pin and including locking means to secure said pin in said bore while allowing said pin to rotate in said bore.

2. The mower apparatus according to claim 1 wherein said hitch apparatus includes:

(a) articulating means configured to prevent substantial rotation of said mower deck relative to said all terrain vehicle about a vertical axis, such that said mower deck remains in tandem with said all terrain vehicle.

3. The mower apparatus according to claim 2 wherein:

(a) said hitch body includes a first segment and a second segment joined by said third pivotal means; and
   (b) said first and second pivotal means are located near opposite ends of said hitch body.

4. The mower apparatus according to claim 3 wherein:

(a) each of said first and second pivotal means including bearing means at least at two spaced locations along the respective axes thereof so as to resist torque of said hitch body in a generally horizontal plane.

5. The mower apparatus according to claim 4 including:

(a) stop means limiting to a preselected range the upward articulation of said mower deck relative to said all terrain vehicle.

6. The mower apparatus according to claim 3 wherein:

(a) said first segment includes a first slide plate having a first slide surface;
   (b) said second segment includes a second slide plate having a second slide surface; and
   (c) said first and second slide surfaces slidingly abut as said pin rotates in said bore so as to distribute rotational torque in a generally horizontal plane acting on said pin along the abutting portion of said slide surfaces and thereby resist twisting about a vertical axis.

7. A hitch having a normal direction of travel during usage comprising:

(a) first mounting means for mounting on a first vehicle;
   (b) hitch body structural means;
   (c) first pivotal means pivotally connecting said first mounting means and said structural means about a first axis that is perpendicular to the normal direction of travel of said hitch;
   (d) a first slide plate secured to said structural means;
   (e) a second slide plate slideably abutting said first slide plate,
   (f) second pivotal means pivotally connecting said first and second slide plates to allow relative rotation thereof about a second axis aligned generally parallel to the normal direction of travel of said hitch; and
   (g) third pivotal means pivotally connecting said body and said second mounting means about a third axis that is generally parallel to said first axis.

8. A hitch mechanism for joining a pair of mobile vehicles such that each vehicle can independently follow the contour of terrain being traversed thereby; said hitch mechanism comprising:

(a) structural means for connecting said vehicles;
   (b) first pivotal means for allowing said vehicles to pivot relative to each other about a first axis transverse to a direction of travel of the vehicles;
   (c) second pivotal means substantially spaced from said first pivotal means and allowing said vehicles to pivot relative to each other about a second axis that is parallel to said first axis;
   (d) third pivotal means for allowing said vehicles to pivot relative to each other about a third axis that is generally parallel to the direction of travel of the vehicles, such that the hitch mechanism is adapted to connect both vehicles and to allow each vehicle to independently follow the contour of ground being traversed thereby, while remaining in tandem relative to each other;
   (e) an elongate member having a first segment and a second segment joined by said third pivotal means;
   (f) said first and second pivotal means being located near opposite ends of said elongate member;
   (g) said third pivotal means comprising a journal pivot pin extending from said first segment and being aligned with said third axis;
   (h) said second segment having a bearing bore pivotally receiving said pin;
   (i) locking means for securing said pin in said bore while allowing said pin to rotate in said bore;
   (j) said first segment including a first slide plate having a first slide surface;
   (k) said second segment including a second slide plate having a second slide surface; and
   (l) said first and second slide surfaces slidingly abutting as said pin rotates in said bore so as to distribute rotational torque in a generally horizontal plane acting on said pin along the abutting portion of said slide surfaces.

9. The hitch mechanism according to claim 8 wherein the vehicles are a front vehicle and a rear vehicle and the rear vehicle is self propelled and drives the front vehicle, said hitch mechanism being adapted to both push the front vehicle while connecting the vehicles one behind the other in tandem, said hitch mechanism structural means including:

(a) articulating means configured to prevent substantial rotation of the front vehicle relative to the rear vehicle about a vertical axis, such that the front vehicle travels in the same general direction as the rear vehicle.

10. The hitch mechanism according to claim 8 wherein:

(a) each of said first and second pivotal means including bearing means at least at two spaced points along the respective axes thereof so as to resist torque of said elongate member in a generally horizontal plane.

11. The hitch mechanism according to claim 10 including:

(a) stop means limiting to a preselected range the upward articulation of said front vehicle relative to said rear vehicle.

12. The hitch mechanism according to claim 11 wherein said stop means includes;

(a) the front vehicle having a rear panel;
(b) said first pivotal means includes at least a first pair of spaced bearings attached to and extending from said rear panel and a second pair of bearings attached to and extending from said elongate member first segment and also being axially aligned with said first pair of bearings;
(c) at least one pivot pin pivotally securing said first and second pairs of bearings together; and
(d) said first vehicle and said hitch mechanism having a spacing configuration that allows each to rotate about said first pivotal means through a limited arc at the extend of thereof said first segment engages said rear panel to prevent further rotation.

13. A hitch mechanism for joining a pair of mobile vehicles such that each vehicle can independently follow the contour of terrain being traversed thereby; said hitch mechanism comprising:

(a) structural means for connecting said vehicles;
(b) first pivotal means for allowing said vehicles to pivot relative to each other about a first axis transverse to a direction of travel of the vehicles;
(c) second pivotal means substantially spaced from said first pivotal means and allowing said vehicles to pivot relative to each other about a second axis that is parallel to said first axis;
(d) third pivotal means for allowing said vehicles to pivot relative to each other about a third axis that is generally parallel to the direction of travel of the vehicles, such that the hitch mechanism is adapted to connect both vehicles and to allow each vehicle to independently follow the contour of ground being traversed thereby, while remaining in tandem relative to each other;
(e) an elongate member having a first segment and a second segment joined by said third pivotal means;
(f) said first and second pivotal means being located near opposite ends of said elongate member;
(g) each of said first and second pivotal means including bearing means at least at two spaced points along the respective axes thereof so as to resist torque of said elongate member in a generally horizontal plane; and
(h) stop means limiting to a preselected range the upward articulation of said front vehicle relative to said rear vehicle.

14. A mower apparatus comprising:

(a) a driver supporting and self propelled all terrain vehicle for motivating the apparatus, vehicle ground engaging wheels, and a steering mechanism;
(b) a mobile non-self propelled mower deck comprising a self contained motor, ground engaging wheels and a cutter blade driven by said motor;
(c) an articulating hitch apparatus joining said mower deck to said all terrain vehicle, such that said mower deck is positioned in front of and motivated by said all terrain vehicle; said hitch apparatus comprising:

1) first mounting means for connecting said hitch apparatus to said all terrain vehicle;
2) second mounting means for connecting said hitch apparatus to said mower deck;
3) a hitch body structurally connecting said first and second mounting means;
4) first pivotal means providing pivotal rotation of said first mounting means relative to said body along a first axis that is generally perpendicular to a normal direction of travel of the apparatus;
5) second pivotal means providing pivotal rotation of said second mounting means relative to said body along a second axis that is spaced from and parallel to said first axis; and
6) third pivotal means allowing said first and second mounting means to rotate relative to each other about a third axis that is generally parallel to the direction of normal travel of said mower apparatus, such that said mower deck and said all terrain vehicle each independently follow the contour of the land being traversed thereby;

(d) articulating means configured for preventing substantial rotation of said mower deck relative to said all terrain vehicle about a vertical axis, such that said mower deck remains in tandem with said all terrain vehicle;
(e) said hitch body including a first segment and a second segment joined by said third pivotal means;
(f) said first and second pivotal means being located near opposite ends of said hitch body;
(g) said third pivotal means comprising a journal pivot pin extending from said first segment and being aligned with said third axis;
(h) said second segment having a bearing bore pivotally receiving said pin; and
(i) locking means for securing said pin in said bore while allowing said pin to rotate in said bore.

15. A mower apparatus comprising:

(a) a driver supporting and self propelled all terrain vehicle for motivating the apparatus, vehicle ground engaging wheels, and a steering mechanism;
(b) a mobile non-self propelled mower deck comprising a self contained motor, ground engaging wheels and a cutter blade driven by said motor;
(c) an articulating hitch apparatus joining said mower deck to said all terrain vehicle, such that said mower deck is positioned in front of and motivated by said all terrain vehicle; said hitch apparatus comprising:

1) first mounting means for connecting said hitch apparatus to said all terrain vehicle;
2) second mounting means for connecting said hitch apparatus to said mower deck;
3) a hitch body structurally connecting said first and second mounting means;
4) first pivotal means providing pivotal rotation of said first mounting means relative to said body along a first axis that is generally perpendicular to a normal direction of travel of the apparatus;
5) second pivotal means providing pivotal rotation of said second mounting means relative to said body along a second axis that is spaced from and parallel to said first axis; and 6) third pivotal means allowing said first and second mounting means to rotate relative to each other about a third axis that is generally parallel to the direction of normal travel of said mower apparatus, such that said mower deck and said all terrain vehicle each independently follow the contour of the land being traversed thereby;

(d) articulating means configured for preventing substantial rotation of said mower deck relative to said all terrain vehicle about a vertical axis, such that said mower deck remains in tandem with said all terrain vehicle;

(e) said hitch body including a first segment and a second segment joined by said third pivotal means;
(f) said first and second pivotal means being located near opposite ends of said hitch body;
(g) said first segment including a first slide plate having a first slide surface;
(h) said second segment including a second slide plate having a second slide surface; and
(i) said first and second slide surfaces slidingly abutting as said pin rotates in said bore so as to distribute rotational torque in a generally horizontal plane acting on said pin along the abutting portion of said slide surfaces and thereby resisting twisting about a vertical axis.

* * * * *